United States Patent
Lee et al.

(10) Patent No.: US 7,158,193 B2
(45) Date of Patent: **\*Jan. 2, 2007**

(54) IMAGE MISCONVERGENCE CORRECTION APPARATUS FOR LESS SWITCHING NOISE INFLUENCE

(75) Inventors: Kyoung-geun Lee, Suwon (KR); Chung-wook Roh, Seoul (KR); Joon-hwan Lee, Gunpo (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 598 days.

This patent is subject to a terminal disclaimer.

(21) Appl. No.: 10/613,026

(22) Filed: Jul. 7, 2003

(65) Prior Publication Data

US 2004/0008290 A1    Jan. 15, 2004

(30) Foreign Application Priority Data

Jul. 11, 2002    (KR) ............................... 2002-40430

(51) Int. Cl.
*H04N 3/22* (2006.01)

(52) U.S. Cl. ................................. 348/806; 315/368.11

(58) Field of Classification Search ........ 348/805–807; 315/368.11, 387, 370
See application file for complete search history.

(56) References Cited

U.S. PATENT DOCUMENTS

| 4,176,300 | A | * | 11/1979 | Waehner ..................... 315/371 |
| 4,961,030 | A | * | 10/1990 | Ogino et al. ........... 315/368.23 |
| 4,961,032 | A | * | 10/1990 | Rodriguez-Cavazos ..... 315/397 |
| 5,414,330 | A | * | 5/1995 | Tsujihara et al. ........... 315/371 |
| 5,532,765 | A | * | 7/1996 | Inoue et al. ................. 348/807 |
| 5,583,400 | A | * | 12/1996 | Hulshof et al. ............. 315/371 |
| 5,656,894 | A | * | 8/1997 | Murakami et al. .......... 315/371 |
| 6,853,157 | B1 | * | 2/2005 | Lee et al. .............. 315/368.11 |
| 2003/0206251 | A1 | * | 11/2003 | Lee ............................ 348/806 |

* cited by examiner

*Primary Examiner*—Paulos M. Natnael
(74) *Attorney, Agent, or Firm*—Sughrue Mion, PLLC

(57) ABSTRACT

Disclosed is an image misconvergence correction apparatus having a correction value generation unit for calculating a convergence correction value to correct misconvergence occurring when a video signal is scanned on a display device; an amplification unit for performing D-class amplification with respect to the convergence correction value; a convergence yoke mounted in the display device to control a path of electron beams corresponding to the video signal based on the convergence correction value amplified in the amplification unit; and a feedback sensing unit for differentially amplifying a voltage value for electric current passing through the convergence yoke, and feeding back the differentially amplified voltage value to the correction value generation unit. The misconvergence correction apparatus amplifies and outputs a convergence correction value through the D-class amplifier having excellent power consumption and heat generation characteristics, calculates the convergence correction value, and minimizes influence of switching noise outputted from the D-class amplifier.

14 Claims, 12 Drawing Sheets

IMAGE MISCONVERGENCE CORRECTION APPARATUS FOR LESS SWITCHING NOISE INFLUENCE

BACKGROUND OF THE INVENTION

1. Field of the Invention

The present invention relates to an image misconvergence correction apparatus for a projection television, and more particularly to an image misconvergence correction apparatus capable of correcting a video signal misconvergence. The present invention is based on Korean Patent Application No. 2002-40430, which is incorporated herein by reference.

2. Description of the Prior Art

In general, a television set scans red (R), blue (B), and green (G) beams from one electron gun on a display device of a cathode ray tube (CRT) to render images. Therefore, in the television set, only one electron gun is controlled for the image misconvergence correction.

In the meantime, a projection television renders images through CRTs projecting images of the respective colors by the R, G, and B beams. The images projected through the respective CRTs are magnified, and the magnified images are reflected by mirror to be displayed on a large screen. Accordingly, the projection television controls the respective CRTs spaced apart from one another so that the R, G, and B beams converge at one point on the screen to implement complete color images, which is called the convergence adjustment. A video displayer such as the projection television, when the beams are not precisely deflected due to the deformations of deflection yokes controlling the respective CRTs or due to the optical locations of the respective CRTs, renders smeared or abnormal colors on the screen, which is referred to as the occurrence of misconvergence.

Figure 1:
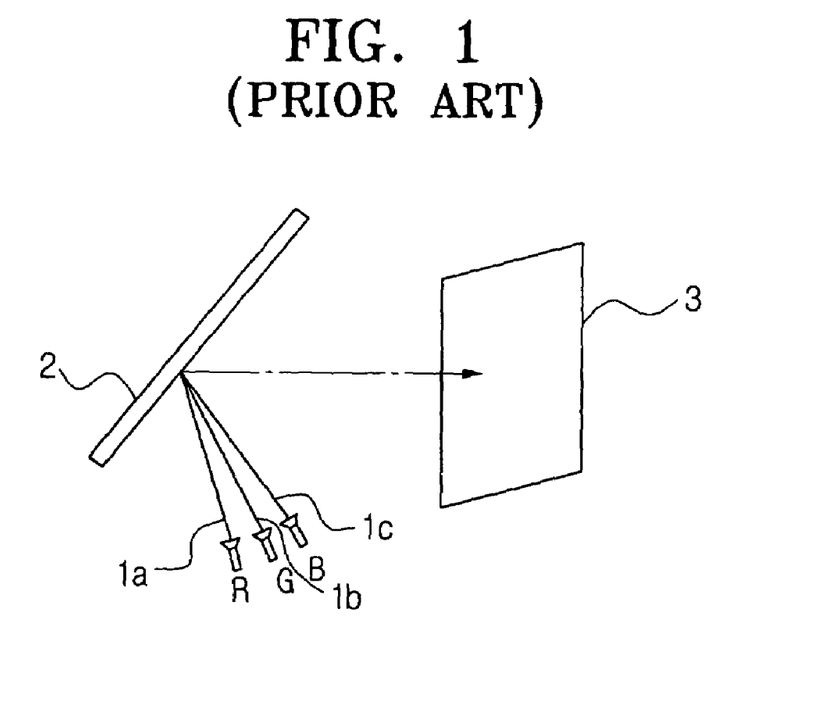
FIG. 1 is a view for schematically showing a display device of a general projection television.

FIG. 1 is a view for schematically showing a display device of a general projection television. The display device has R, G, and B CRTs 1a, 1b, and 1c, a mirror 2, and a screen 3. The respective R, G, and B CRTs spaced apart from one another in a certain distance project images to the mirror 2, the projected images are reflected from the mirror 2 and then displayed on the screen 3. At this time, the images displayed on the screen 3 may have optical distortions due to the locations and angles of the respective R, G, and B CRTs 1a, 1b, and 1c.

Figure 2:
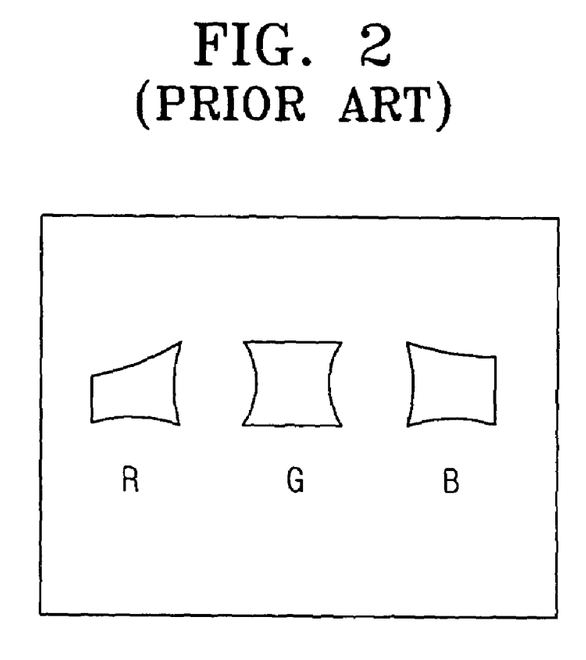
FIG. 2 is a view for showing shapes of images of respective R, G, and B CRTs which are displaying on the screen of FIG. 1.

FIG. 2 shows shapes of the images projected on the screen 3 by the respective R, G, and B CRTs 1a, 1b, and 1c, the images being shown on the screen 3 of FIG. 1. As shown in FIG. 2, the image from the R CRT 1a is distorted to the right, the image from the B CRT 1b is distorted to the left, and the image from the G CRT 1c is distorted concave, due to the relative locations of the R, G, and B CRTs 1a, 1b, and 1c. Accordingly, the images projected on the screen 3 by the respective R, G, and B CRTs 1a, 1b, and 1c are matched to implement one image, the shape and color of the image are displayed distortedly.

Figure 3:
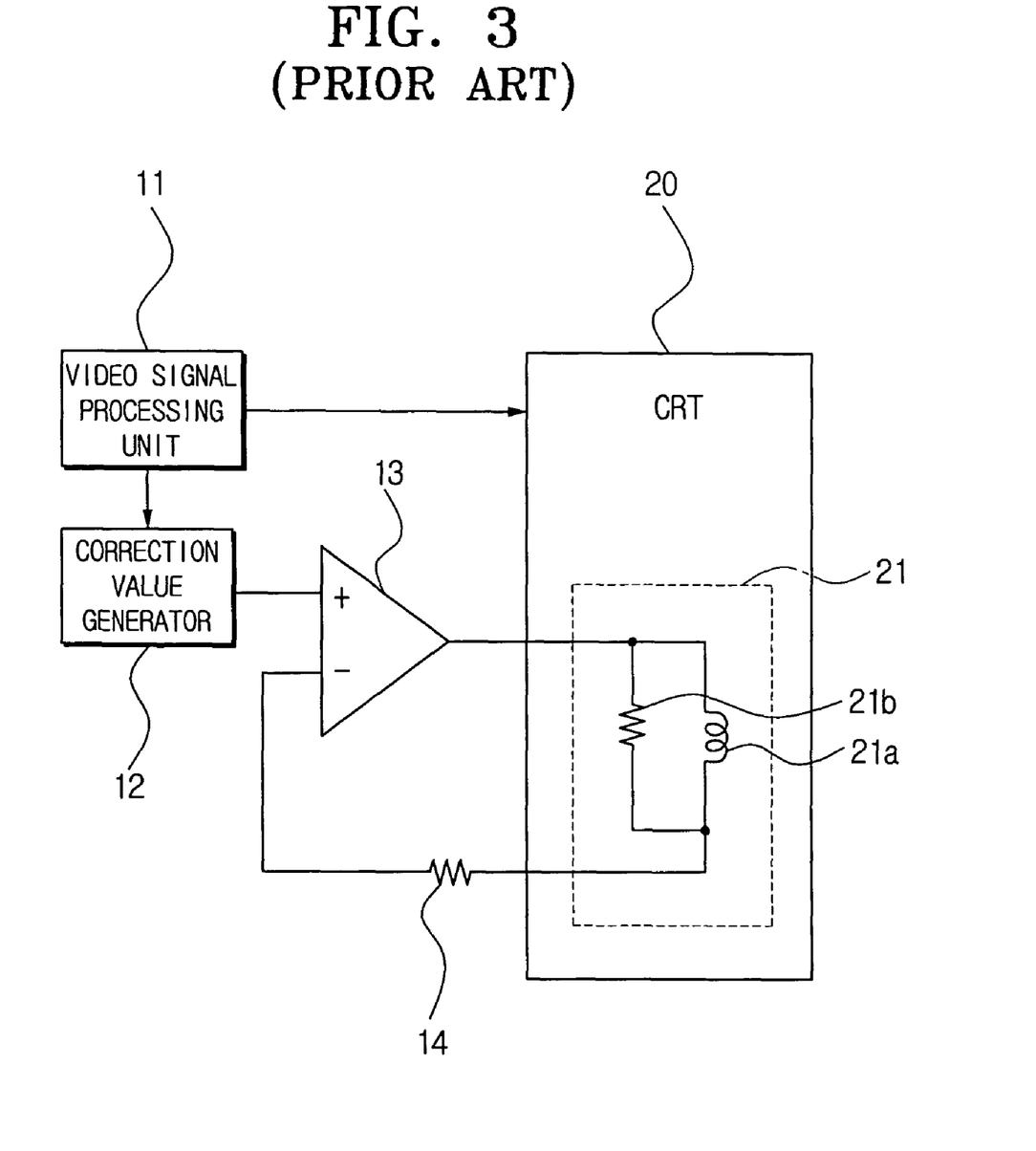
FIG. 3 is a view for schematically showing a conventional convergence correction apparatus using an A-class amplifier.

FIG. 3 is a view for schematically showing a conventional convergence correction apparatus using an A-class amplifier.

The convergence correction apparatus shown in FIG. 3 has a video signal processing unit 11, a correction value generator 12, an operational amplifier 13, and a convergence yoke 21 built in a CRT 20.

The video signal processing unit 11 processes a broadcast signal externally received to output a video signal, and vertical and horizontal synchronous signals.

The correction value generator 12 is synchronized with the vertical and horizontal synchronous signals outputted from the video signal processing unit 11, and outputs a convergence correction value for a convergence correction.

The operational amplifier 13 amplifies the convergence correction value up to a high-power signal. In general, the convergence yoke coil 21a built in the convergence yoke 21 is driven by a high voltage and a high electric current to form a magnetic field, and an electron beam path is changed by the formed magnetic field. Therefore, the operational amplifier 13 may be any of A-class, B-class, and C-class amplifiers which linearly amplifies currents and voltages in most occasions. A feedback resistor 14 feeds back to the operational amplifier 13 a voltage value for current passing through the convergence coil 21a to heighten or lower an amplification degree of the operational amplifier 13.

In the meantime, the above A-, B-, or C-class amplifier is configured with a power transistor to form an amplification stage for linearly amplifying voltages and currents. The power transistor has a drawback to high turn-on resistance and power consumption due to the nature of current-driven devices.

The power efficiency of a general power transistor does not exceed 50%, and the rest of the power is converted into heat. Accordingly, the operational amplifier having the A-, B-, or C-class amplification stage has a problem of a big heat sink to be provided due to the power consumption.

Figure 4:
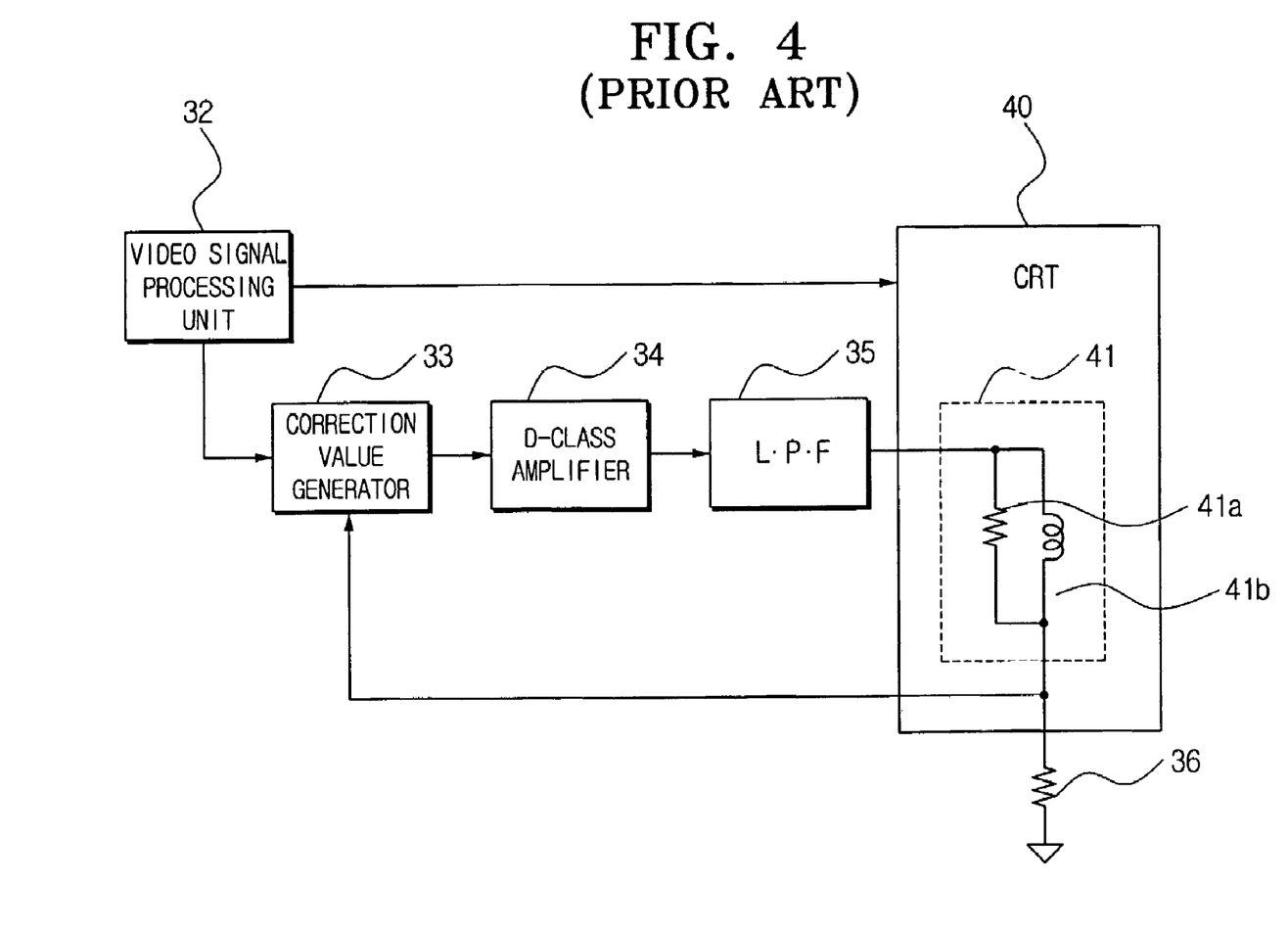
FIG. 4 is a conceptual block diagram for another conventional convergence correction apparatus.

FIG. 4 is a block diagram for conceptually showing a convergence correction apparatus partially compensated for the drawback to the convergence correction apparatus shown in FIG. 3.

The convergence correction apparatus shown in FIG. 4 has a video signal processing unit 32, a correction value generator 33, a D-class amplifier 34, a low-pass filter (LPF) 35, and a CRT 40 provided with a convergence yoke 41 thereon.

The video signal processing unit 32 processes an external broadcast signal and outputs a video signal, a horizontal frequency, and a vertical frequency.

The correction value generator 33 calculates a convergence correction value to correct a video signal convergence based on a convergence distortion value.

The D-class amplifier 34 inputs and amplifies the convergence correction value to a high-power signal having a predetermined voltage and current. At this time, the D-class amplifier 34 uses a field effect transistor (FET) to perform amplifications based on switching operations. The D-class amplifier using the FET has a high power efficiency compared to a method of driving a convergence yoke by the power transistor, since the D-class amplifier has very low turn-on resistance. Accordingly, the D-class amplifier 34 has low power consumption and heat generation compared to a linear power transistor. The output of the D-class amplifier 34 is filtered in a low-pass filter 35, and applied to the convergence yoke 41 built in the CRT 40. At this time, current applied to the convergence yoke 40 is converted into a predetermined voltage value by a resistor 36 and fed back to the correction value generator 33.

Figure 5:
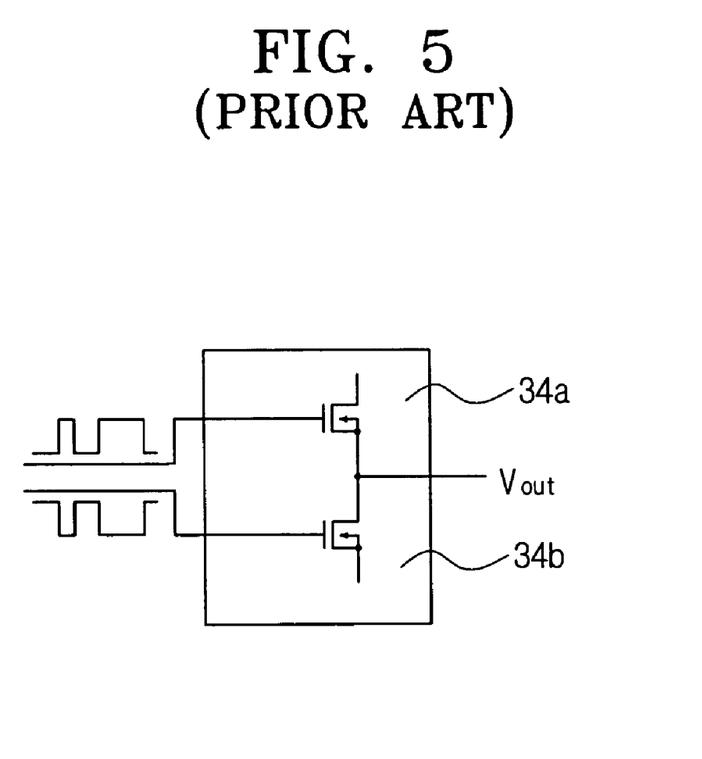
FIG. 5 is a view for explaining an operation concept of a D-class amplifier shown in FIG. 4.

FIG. 5 is a view for explaining an operation concept of the D-class amplifier 34 shown in FIG. 4.

As shown in FIG. 5, the D-class amplifier 34 operates in response to a positive pulse and a negative pulse formed by inverting the positive pulse. In here, the positive pulse is a convergence correction value outputted from the correction value generator 33, and the negative pulse is obtained by inverting the convergence correction value inputted in the D-class amplifier 34.

Figure 6:
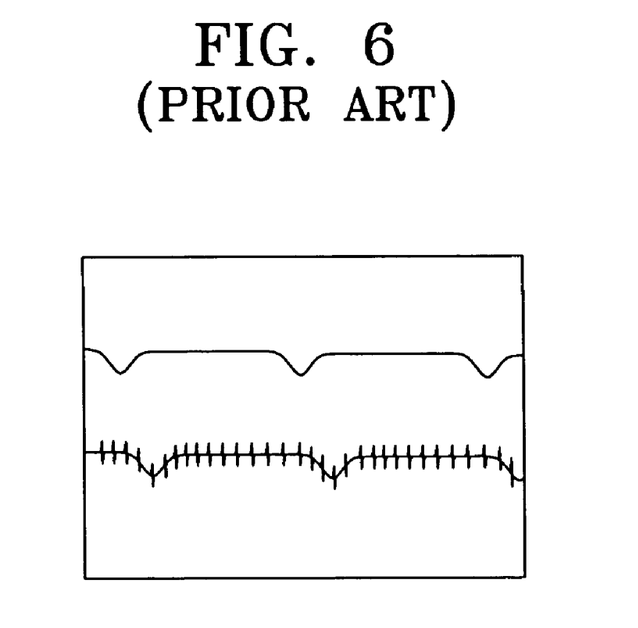
FIG. 6 is a view for showing a waveform of an output voltage outputted from the D-class amplifier shown in FIG. 5.

FIG. 6 is a view for showing a waveform of an output voltage Vout outputted from the D-class amplifier 34 shown in FIG. 5.

As shown in FIG. 6, the D-class amplifier 34 is operated by two enhancement-type NMOS's 34a and 34b which are alternately turned on and off. Accordingly, noise due to voltage changes occurring at the time the respective enhancement-type NMOS's 34a and 34b are turned on and off, that is, switching noise appears in the output voltage Vout. Therefore, the switching noise is fed back to the correction value generator 33, causing a problem that the correction value generator 33 is malfunctioned by the switching noise.

SUMMARY OF THE INVENTION

The present invention has been devised to solve the above conventional problems, so it is an object of the present invention to provide a misconvergence correction apparatus and method for less switching noise influence.

The above object according to the present invention is achieved by an image misconvergence correction apparatus which comprises a correction value generation unit for calculating a convergence correction value to correct misconvergence occurring when a video signal is scanned on a display device; an amplification unit for performing a D-class amplification with respect to the convergence correction value; a convergence yoke mounted in the display device to control a path of an electron beam corresponding to the video signal based on the convergence correction value amplified in the amplification unit; and a feedback sensing unit for differentially amplifying a voltage value for electric current passing through the convergence yoke, and feeding back the differentially amplified voltage value to the correction value generation unit.

Preferably, the correction value generation unit includes a convergence module for outputting a pre-set misconvergence value; a triangular waveform generation unit for generating a triangular waveform based on a pre-set frequency; a combining unit for combining the misconvergence value and an output voltage of the feedback sensing unit; a comparison unit for comparing potential levels of voltages outputted from the combining unit and the triangular waveform generation unit; and a pulse generation unit for generating a pulse width-modulated signal based on a comparison result of the comparison unit.

Preferably, the convergence module is synchronized with horizontal and vertical synchronous signals applied to the display device, and outputs the misconvergence value, and the outputted misconvergence value is set by predicting misconvergence values the display device has.

Preferably, the feedback sensing unit includes a first resistor and a second resistor connected in series between the convergence yoke and an earth terminal, a third resistor being inputted with a voltage induced at one end of the first resistor, a fourth resistor being inputted with a voltage induced at the other end of the first resistor, an operational amplifier being inputted with an output voltage from the second resistor as a positive input, while being inputted with an output voltage from the third resistor as a negative input, a fifth resistor connected between the negative input terminal and an earth terminal of the operational amplifier, and a sixth resistor connected between the positive input terminal and an output terminal of the operational amplifier.

Preferably, the convergence yoke has a damping resistor for forming a loop-shaped current path together with both ends of the convergence yoke and electrically discharging the convergence yoke.

Preferably, the convergence correction value is in pulse width-modulated waveform.

Preferably, the misconvergence value has pre-set frequency and amplitude, and is any of sinusoidal waveform, square waveform, triangular waveform, rectangular waveform, saw-teeth waveform, and parabolic waveform.

According to the present invention, the above object is achieved by an image misconvergence correction method which comprises steps of calculating a convergence correction value of a pulse to correct a misconvergence value of a video signal outputted from a display device; performing D-class amplification with respect to the convergence correction value to amplify voltages and currents; controlling a path of an electron beam corresponding to the video signal by a magnetic field formed according to a current based on the D-class-amplified convergence correction value; removing noise with respect to the current forming the magnetic field; and calculating a voltage value for a noise-removed current, and feeding back to the step for calculating the convergence correction value.

Preferably, the feedback step includes steps of calculating voltages for the current forming the magnetic field; amplifying the voltages and obtaining a differential voltage of the voltages; and amplifying the differential voltage and generating a predetermined voltage value.

Preferably, the step for calculating the convergence correction value includes steps of inputting the misconvergence value; generating a triangular waveform of a set frequency; comparing potential levels of the misconvergence value and the triangular waveform; and generating a pulse width-modulated signal based on a result of the comparison.

Preferably, the step for calculating the convergence correction value further includes steps of inputting the fed-back voltage value; and combining the triangular waveform and the fed-back voltage value.

Preferably, after the step for performing the D-class amplification, a step for low-pass-filtering the amplified convergence correction value is further included.

BRIEF DESCRIPTION OF THE DRAWINGS

The above object and other features of the present invention will become more apparent by describing in detail a preferred embodiment thereof with reference to the attached drawings, in which.

DESCRIPTION OF THE PREFERRED EMBODIMENT

Hereinafter, the preferred embodiment of the present invention will be described in greater detail with reference to the accompanying drawings.

Figure 7:
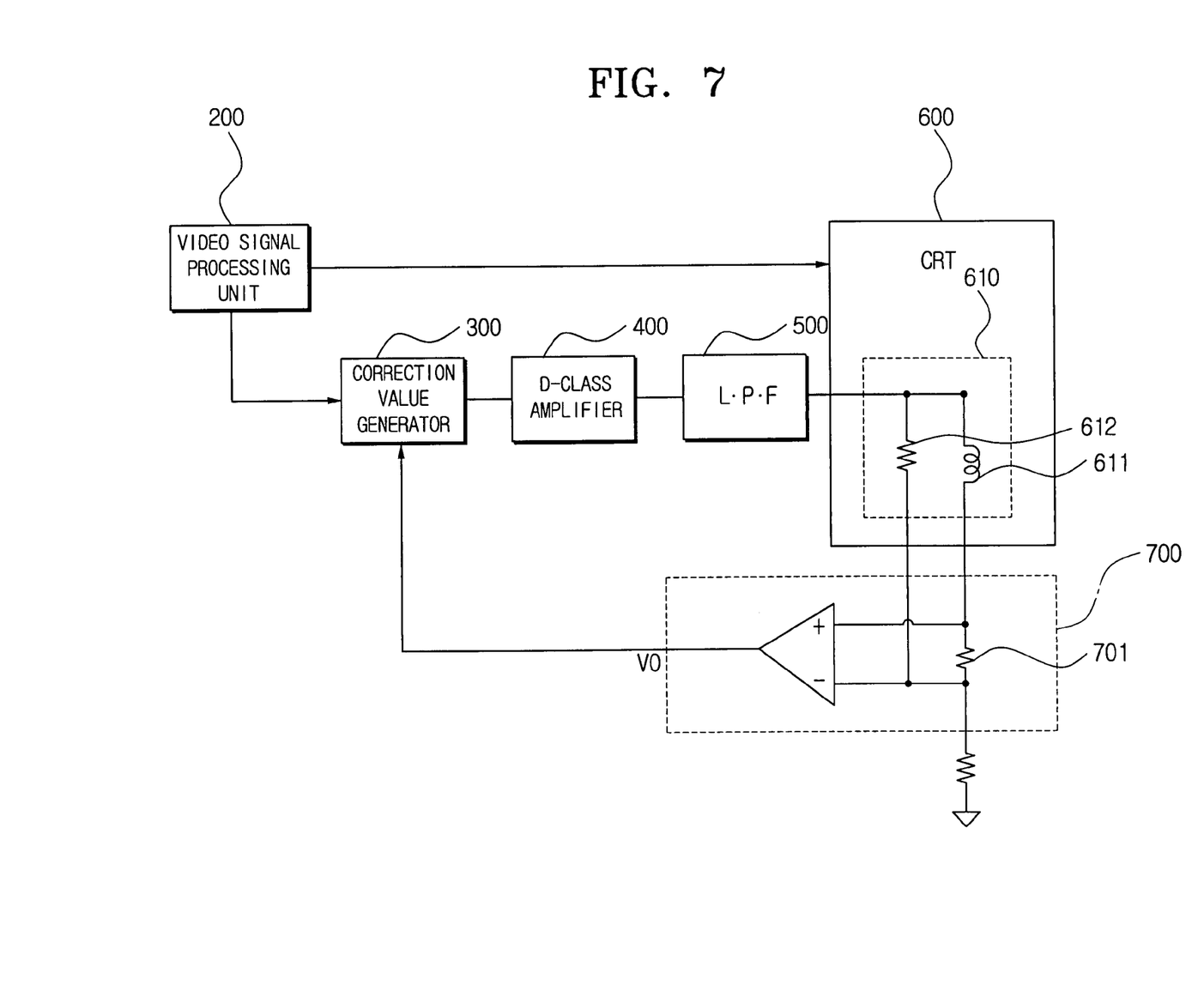
FIG. 7 is a conceptual block diagram for a video image misconvergence correction apparatus according to an embodiment of the present invention.

FIG. 7 is a conceptual block diagram for showing an image misconvergence correction apparatus according to an embodiment of the present invention.

The image misconvergence correction apparatus in FIG. 7 has a video signal processing unit 200, a correction value generator 300, a D-class amplifier 400, a low-pass filter (LPF) 500, a CRT 600, a convergence yoke 610, and a feedback sensor 700.

The video signal processing unit 200 processes a broadcast signal from an external source, and outputs a video signal, and vertical and horizontal synchronous signals. The video signal is transmitted to the CRT 600, and the vertical and horizontal synchronous signals are outputted to the correction value generator 300.

The correction value generator 300 is synchronized with the vertical and horizontal synchronous signals outputted from the video signal processing unit 200, and calculates and outputs a convergence correction value. At this time, the convergence correction value appears in a pulse waveform which is pulse width-modulated.

The D-class amplifier 400 amplifies and outputs the convergence correction value of pulse waveform by switching operations. Accordingly, certain switching noise occurs at the output terminal of the D-class amplifier 400. The D-class amplifier 400 has the same structure as that shown in FIG. 5 as well as having the input and output characteristics shown in FIG. 6. Accordingly, the detailed description of the D-class amplifier 400 will be omitted.

The low-pass filter (LPF) 500 filters the convergence correction value amplified in the D-class amplifier 400, based on a preset value, so that it reduces the switching noise occurring in the D-class amplifier 400.

The CRT 600 displays on the screen the video signal processed in the video signal processing unit 200. At this time, a convergence yoke installed on the CRT 600 corrects the path of a beam to be scanned on the screen of the CRT 600 in response to the convergence correction value applied from the low-pass filter 500.

Preferably, the convergence yoke 610 has a damping resistor 612 for discharging the convergence yoke coil 611.

The damping resistor 612 forms a current path together with the convergence yoke coil 611, and removes residual currents remaining in the convergence yoke coil 611 after the convergence correction to prevent a residual magnetic field from being formed in the convergence yoke coil 611.

The feedback sensor 700 calculates, performs a differential amplification for, and outputs a voltage value for current passing through the convergence yoke coil 611 to remove the switching noise of the current passing through the convergence yoke coil 611. The noise-removed current is fed back to the correction value generator 300. Accordingly, a projection television having the image misconvergence apparatus does not require a high-performance D-class amplifier with small switching noise.

Figure 8:
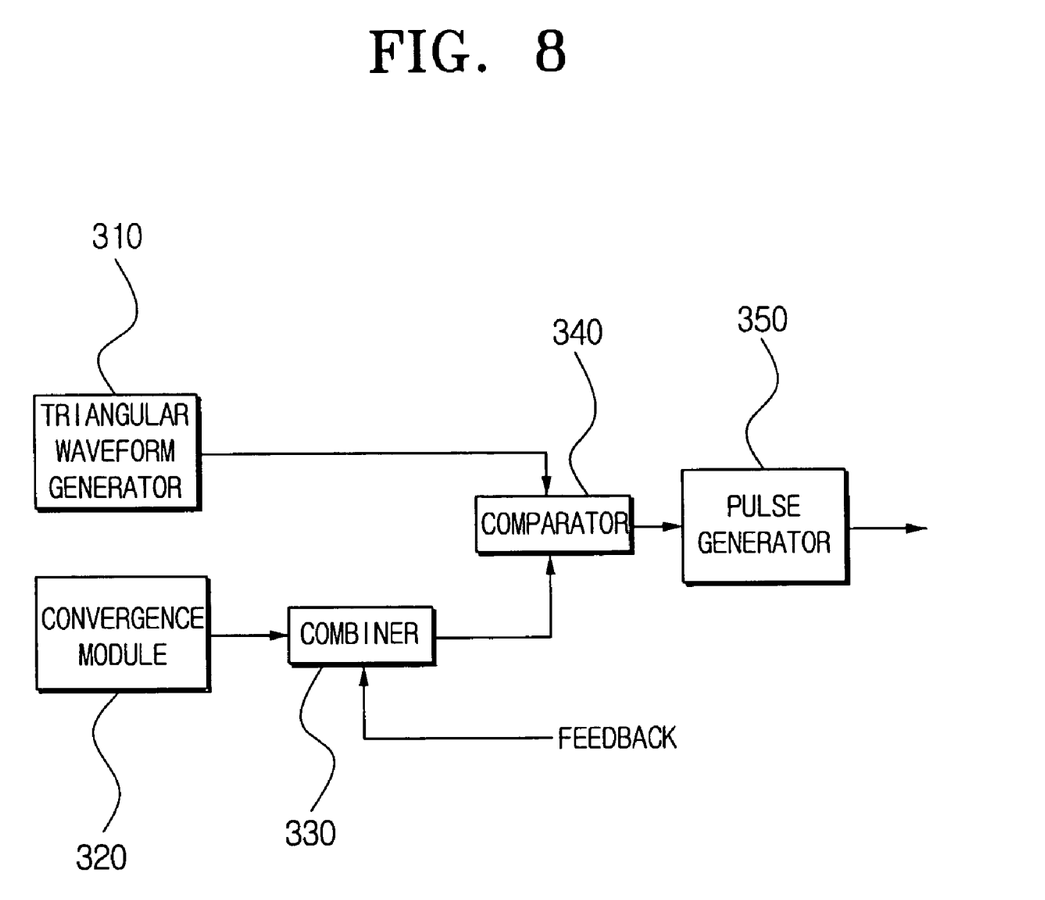
FIG. 8 is a block diagram for showing in detail an internal structure of a correction value generator.

FIG. 8 is a block diagram for showing in detail an internal structure of the correction value generator 300.

The correction value generator 300 has a triangular waveform generator 310, a convergence module 320, a combiner 330, a comparator 340, and a pulse generator 350.

The triangular waveform generator 310 outputs a triangular waveform based on preset frequency and amplitude.

The convergence module 320 stores values calculated in advance for misconvergence values of a video displayer, and outputs the stored values in synchronization with the horizontal and vertical synchronous signals applied to the video displayer. The stored misconvergence values are sequentially outputted according to the horizontal synchronous signal, and a stored value, which is pre-set, corresponding to the first scan line of the video displayer is outputted when the vertical synchronous signal is applied.

At this time, the misconvergence value outputted from the convergence module 320 has any of sinusoidal waveform, triangular waveform, rectangular waveform, saw-teeth waveform, and parabolic waveform, and may be any of other analog pulse waveforms which are not referred to above.

The combiner 330 combines a triangular waveform and voltages fed back from the feedback sensor 700, and calculates a misconvergence value to obtain a constant voltage across the convergence yoke 610.

The comparator 340 compares a misconvergence value outputted from the combiner 330 to a potential level of triangular waveform to obtain a difference therebetween.

The pulse generator 350 generates a pulse width-modulated (PWM) signal having predetermined amplitude and period based on a comparison result of the comparator 340.

Figure 9A:
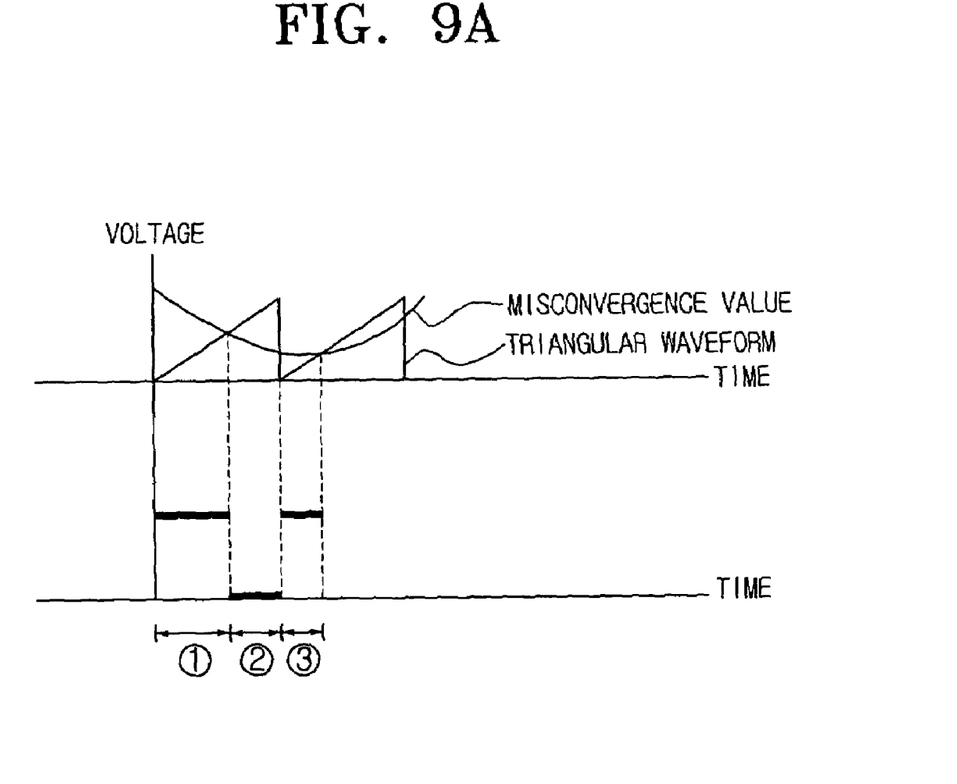
FIG. 9A is a view for explaining an operation principle of a comparator.
Figure 9B:
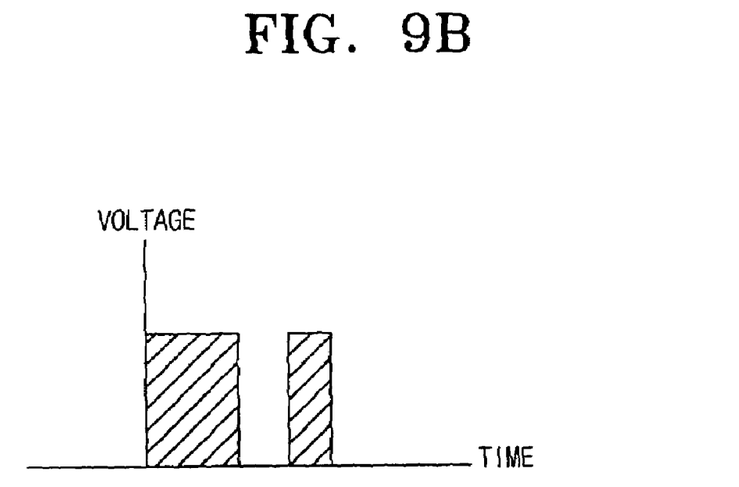
FIG. 9B is a view for explaining an operation principle of the pulse generator of FIG. 9A.

FIG. 9A is a view for explaining an operation principle of the comparator 340, and FIG. 9B is a view for explaining an operation principle of the pulse generator 350.

As shown in FIGS. 9A and 9B, a comparison result of section ① and section ③ shows, with reference to a misconvergence value, that the potential level of the misconvergence value is higher than a triangular waveform and section ② has the potential level of the misconvergence value less than or equal to that of the triangular waveform. Accordingly, when such a voltage signal is applied to the pulse generator 350, the pulse generator 350 generates a pulse width-modulated signal having predetermined period and amplitude based on a comparison result of the comparator 340, as shown in FIG. 9B.

Figure 10:
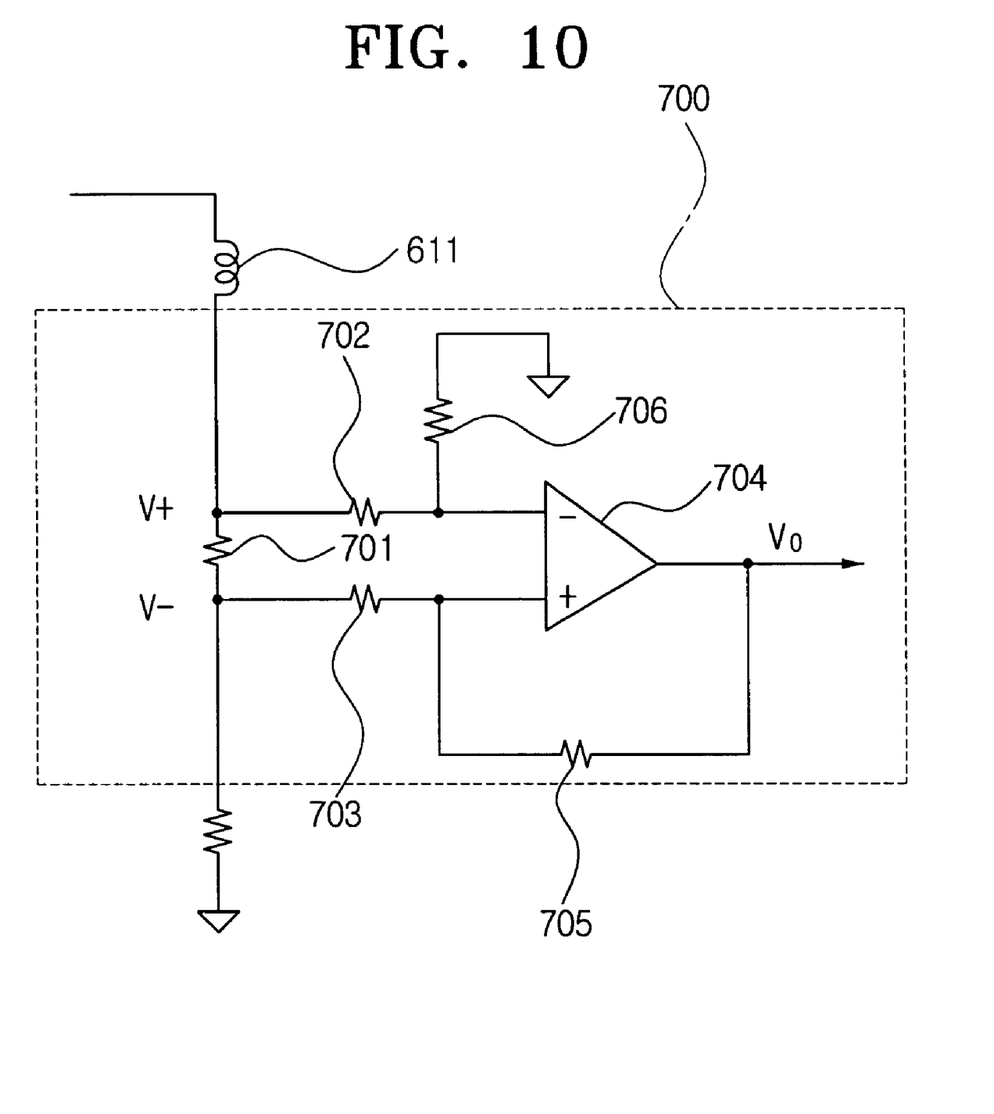
FIG. 10 is a view for showing a feedback sensor according to an embodiment of the present invention.

FIG. 10 is a view for showing in more detail the feedback sensor 700 shown in FIG. 7 according to an embodiment of the present invention.

As shown in FIG. 10, a resistor 701 is connected in series to the convergence yoke coil 611 to obtain a voltage value of current passing through the convergence yoke coil 611. At this time, the resistor 701 has a low resistance value of a few Ω~tens Ω not to increase a phase difference of voltages inputted to the positive terminal (+) and negative terminal (−) of an operational amplifier 704. Accordingly, differential voltages having the same phase are applied to the positive terminal (+) and negative terminal (−) of the operational amplifier 704, and a feedback sensor 700 constructed with differential amplifiers removes noise included in electric current passing through the convergence yoke coil 611, which is fed back to the combiner 330. In here, resistors 702, 703, 705, and 706 are those determining an amplification degree of the operational amplifier 704, and, since the operational amplifier 704 amplifies a voltage occurring in a difference between the voltages applied to the positive terminal (+) and negative terminal (−) thereof, the resistors 703, 705, and 706 have the same value. For example, the resistors 702 and 703 have 30 kΩ, respectively, and the resistors 705 and 706 have 330 kΩ, respectively, in order to perform differential amplifications. At this time, the operational amplifier 704 has a ten times amplification degree.

Figure 11:
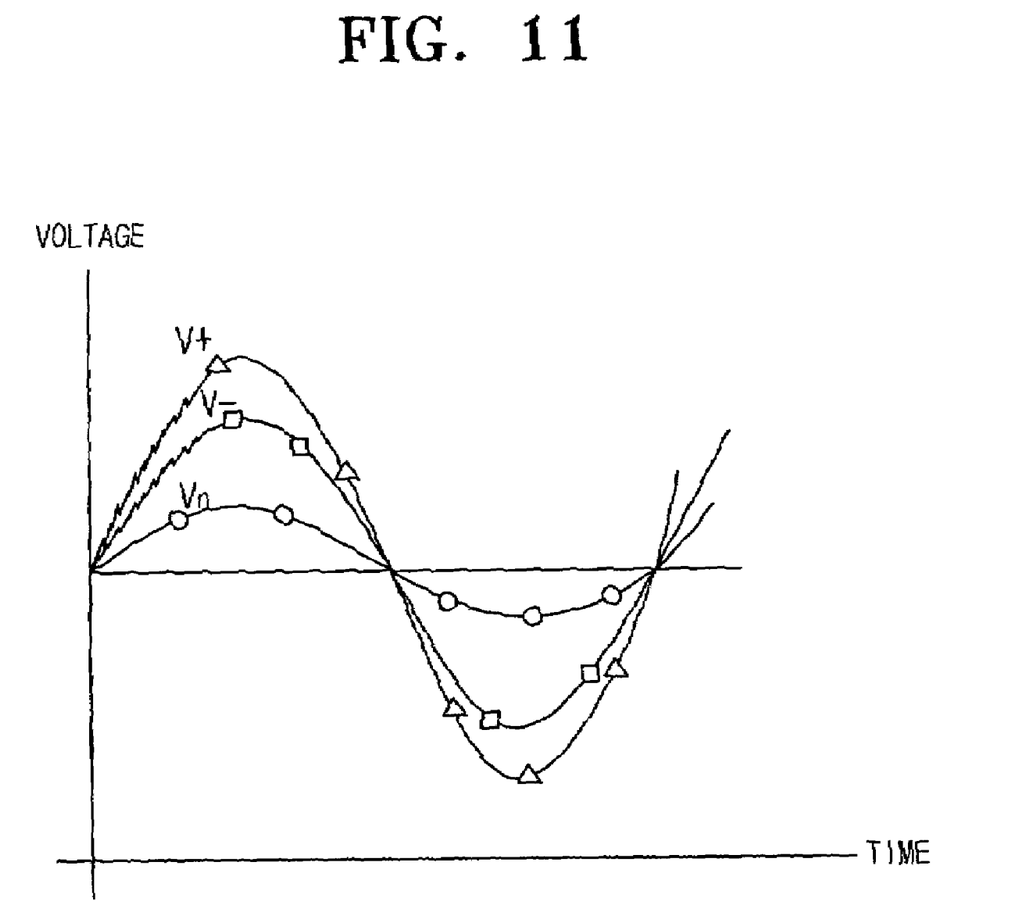
FIG. 11 is a view for showing input and output voltage waveforms of the feedback sensor shown in FIG. 10.

FIG. 11 is a waveform view for showing voltage waveforms V+ and V− across the resistor 701 shown in FIG. 10 and an output voltage waveform Vo of the operational amplifier 704.

As shown in FIG. 11, the voltages V+ and V− respectively applied to the positive terminal (+) and negative terminal (−) of the operational amplifier 704 are in phase, so that a noise-removed voltage waveform Vn is generated when the operational amplifier 704 performs the differential amplification with respect to the voltages V+ and V−. Therefore, the feedback sensor 700 amplifies the noise-removed voltage waveform Vn based on a predetermined amplification degree of the operational amplifier 704, which is fed back to the correction value generator 300. Accordingly, the correction value generator 300 is not affected by the switching noise occurring in the D-class amplifier 400 when calculating a convergence correction value. In here, the voltage waveform Vn is a signal inside the operational amplifier 704, and has an analog voltage value.

Figure 12:
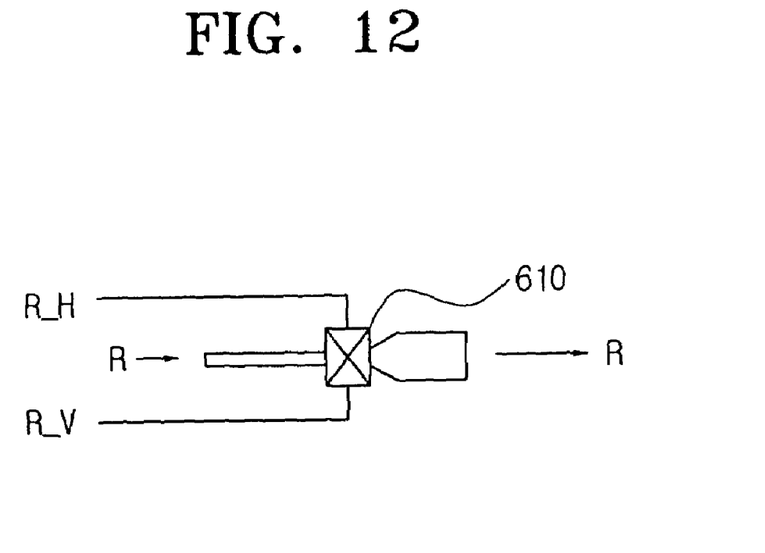
FIG. 12 is a view for conceptually showing a CRT structure.

FIG. 12 is a view for showing a structure of the CRT 600.

The CRT 600 is constructed with three convergence yokes for correcting electron beam paths in response to currents R_H, G_H (not shown), and B_H (not shown) respectively controlling horizontal convergences of R, G, and B and currents R_V, G_V (not shown), and B_V (not shown) respectively controlling horizontal convergences of R, G, and B. Shown in FIG. 12 is only the convergence yoke 610 controlling the red color R out of convergence yokes for the respective colors. The convergence yokes of the CRTs for correcting electron beam paths of green G and blue B colors have also the same shape as that shown in FIG. 12, so that the structures are not shown.

As shown in FIG. 12, the operation of the convergence yoke 610 is controlled by the currents R_H and R_V for controlling horizontal and vertical directions. In here, the currents R_H and R_V for controlling the convergence yoke are correction values amplified in the D-class amplifier 400.

Figure 13:
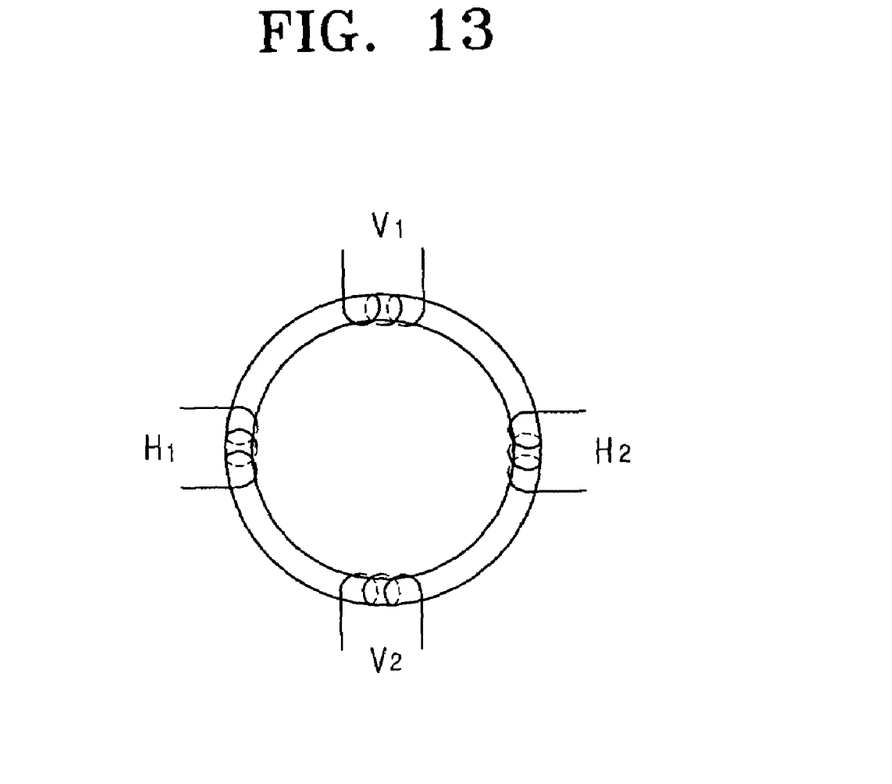
FIG. 13 is a cross-sectioned view of a convergence yoke coil built in a convergence yoke shown in FIG. 12.

FIG. 13 is a cross-sectioned view of the convergence yoke coil 611 built in the convergence yoke 610 shown in FIG. 12.

The convergence yoke coil 611 is mounted on the CRT 600 in an annular shape. The convergence yoke coil 611 consists of coils H1 and H2 symmetrically disposed in the left and right sides to control the horizontal path of an electron beam for the red color in response to the current R_H, and also has coils V1 and V2 disposed on the upper and lower sides to control the vertical path of the electron beam for the red color in response to the current R_V. The current R_H is applied to the coils H1 and H2 controlling the horizontal path, and the current R_V is applied to the coils V1 and V2 controlling the vertical path. Accordingly, predetermined magnetic fields are formed based on the currents applied to the convergence yoke coil 611, so that the electron beam of the red color is corrected in its scan direction by the magnetic fields formed by the convergence yoke coil 611.

Figure 14:
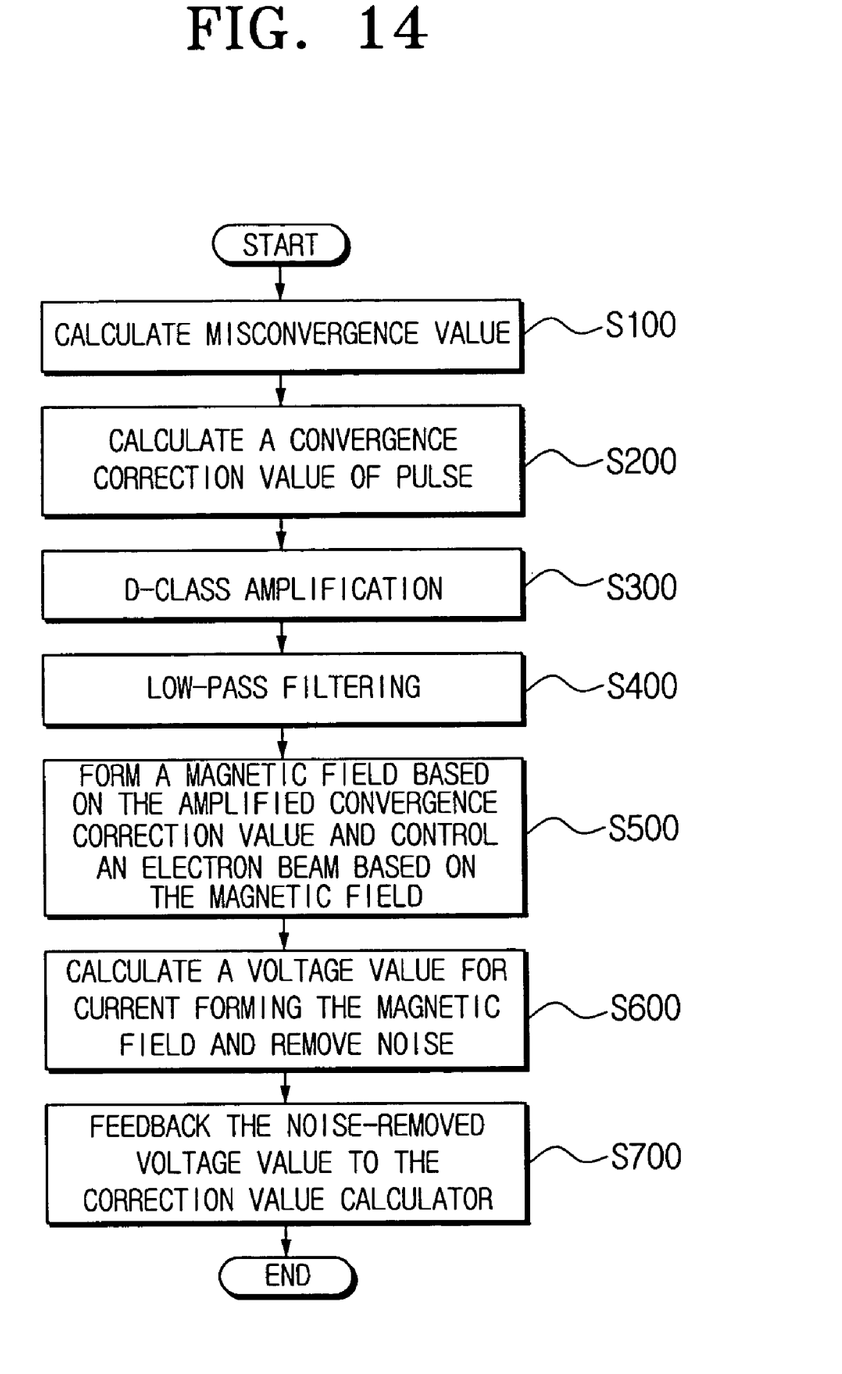
FIG. 14 is a flow chart for showing a process for correcting image misconvergence using an image misconvergence apparatus according to an embodiment of the present invention.

FIG. 14 is a flow chart for showing a process for correcting image misconvergence using an image misconvergence apparatus according to an embodiment of the present invention.

First, the convergence module 320 is synchronized with the vertical and horizontal synchronous signals outputted from the video signal processing unit 200 and outputs a convergence correction value which is pre-set (S100). Next, the correction value generator 300 calculates a convergence correction value of a pulse from the misconvergence value (S200). The D-class amplifier 400 performs the D-class amplification as to the convergence correction value of a pulse (S300). The present image misconvergence method has the amplification characteristics of low heat generation and high efficiency by performing the D-class amplification as to the convergence correction value. Next, the amplified convergence correction value is filtered based on the pre-set value (S400). The convergence yoke coil 610 is driven based on the D-class amplified convergence correction value so that a predetermined magnetic field is formed, and the path of an electron beam projected from the CRT 600 is controlled by the formed magnetic field (S500). Next, a voltage value is obtained for the current forming the magnetic field from the convergence yoke coil 610, and the voltage value is differentially amplified to remove noise included in the current (S600). Lastly, the noise-removed voltage value is fed back to the correction value generator 300 (S700). Accordingly, the correction value generator 300 re-calculates a convergence correction value in consideration of the fed-back voltage value.

Figure 15:
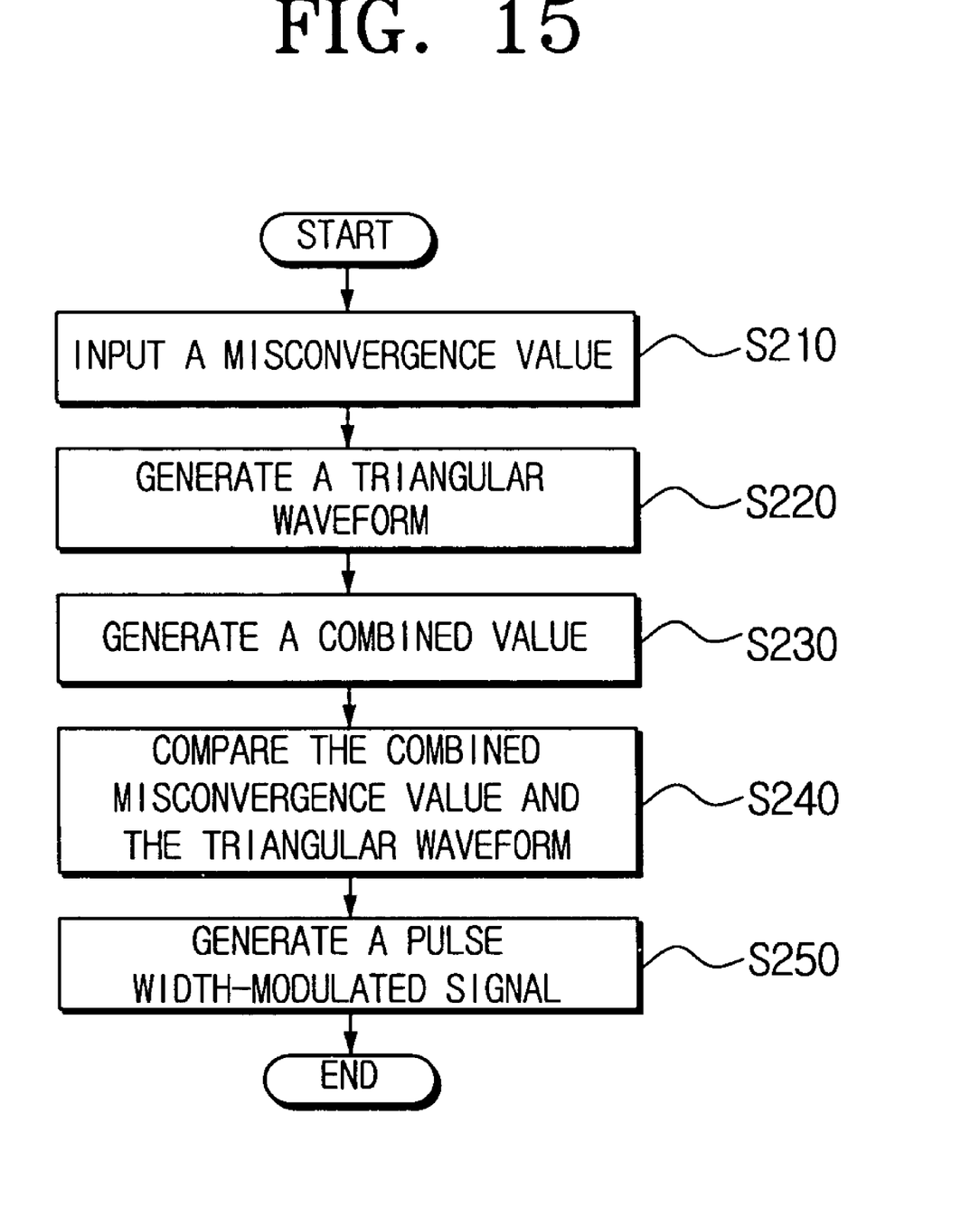
FIG. 15 is a flow chart for showing the step S200 of FIG. 14 in more detail.

FIG. 15 is a flow chart for showing in detail the step S200 for calculating the convergence correction value of a pulse.

First, the convergence module 320 outputs a misconvergence value set in advance (S210). At this time, the convergence module 320 is synchronized, for an output, with the horizontal and vertical frequencies applied to a display device such as a CRT. Next, the triangular waveform generator 310 generates a triangular waveform based on period and amplitude set in advance (S220). The combiner 330 combines the fed-back voltage noise-removed from the feedback sensor 700 and the misconvergence value, and generates a corrected misconvergence value (S230). At this time, the combined misconvergence value has a form of analog signal. Next, the combined misconvergence value and the triangular waveform are compared (S240). At this time, the comparison of the combined value of analog signal with the triangular waveform results in logic "high" or "low" to base the generation of a digital signal such as a pulse width-modulated signal. Lastly, a pulse width-modulated signal is generated based on a logic value depending on the comparison result of the comparator 240 (S250). At this time, the generated pulse width-modulated signal is generated by the comparison of the combined value based on the noise-removed voltage of the feedback sensor 700 with the triangular waveform, so that an output signal is not distorted due to noise. Accordingly, the distortion of the convergence correction value is not produced by noise occurring due to the D-class amplification in the present misconvergence correction method.

The present invention, as described above, amplifies and outputs a convergence correction value through the D-class amplifier having excellent power consumption and heat generation characteristics so that a big heat sink is not required. Therefore, the present image misconvergence correction apparatus enables a television set to be reduced in size with less power consumption. Further, upon calculating the convergence correction value, the present invention reduces and feeds back switching noise outputted from the D-class amplifier to minimize misconvergence due to the switching noise, so that a high-performance D-class amplifier with less switching noise is not required.

Although the preferred embodiments of the present invention has been described, it will be understood by those skilled in the art that the present invention should not be limited to the described preferred embodiments, but various changes and modifications can be made within the spirit and scope of the present invention as defined by the appended claims.

What is claimed is:

1. An image misconvergence correction apparatus, comprising:
    a correction value generation unit for calculating a convergence correction value to correct misconvergence occurring when a video signal is scanned on a display device;
    an amplification unit for performing a D-class amplification with respect to the convergence correction value;
    a convergence yoke mounted in the display device to control a path of an electron beam corresponding to the video signal based on the convergence correction value amplified in the amplification unit; and
    a feedback sensing unit for differentially amplifying a voltage value for electric current passing through the convergence yoke, and feeding back the differentially amplified voltage value to the correction value generation unit.

2. The image misconvergence correction apparatus as claimed in claim 1, wherein the correction value generation unit includes:
    a convergence module for outputting a pre-set misconvergence value;
    a triangular waveform generation unit for generating a triangular waveform based on a pre-set frequency;
    a combining unit for combining the misconvergence value and an output voltage of the feedback sensing unit;
    a comparison unit for comparing potential levels of voltages outputted from the combining unit and the triangular waveform generation unit; and
    a pulse generation unit for generating a pulse width-modulated signal based on a comparison result of the comparison unit.

3. The image misconvergence correction apparatus as claimed in claim 2, wherein the convergence module is synchronized with horizontal and vertical synchronous signals applied to the display device, and outputs the misconvergence value, and the outputted misconvergence value is set by predicting misconvergence values of the display device.

4. The image misconvergence correction apparatus as claimed in claim 3, wherein the feedback sensing unit includes:
    a first resistor and a second resistor connected in series between the convergence yoke and a ground terminal;
    a third resistor being inputted with a voltage induced at one end of the first resistor;
    a fourth resistor being inputted with a voltage induced at the other end of the first resistor;
    an operational amplifier being inputted with an output voltage from the second resistor as a positive input, while being inputted with an output voltage from the third resistor as a negative input;
    a fifth resistor connected between the negative input terminal and a ground terminal of the operational amplifier; and
    a sixth resistor connected between the positive input terminal and an output terminal of the operational amplifier.

5. The image misconvergence correction apparatus as claimed in claim 4, wherein the convergence yoke has a damping resistor for forming a loop-shaped current path together with both ends of the convergence yoke and electrically discharging the convergence yoke.

6. The image misconvergence correction apparatus as claimed in claim 5, wherein the convergence correction value is in pulse width-modulated waveform.

7. The image misconvergence correction apparatus as claimed in claim 6, wherein the misconvergence value has pre-set frequency and amplitude, and is any of sinusoidal waveform, square waveform, triangular waveform, rectangular waveform, saw-teeth waveform, and parabolic waveform.

8. The image misconvergence correction apparatus as claimed in claim 7, further comprising a low-pass filter provided between the amplification unit and the convergence yoke, and for filtering and outputting the convergence correction value amplified in the amplification unit.

9. An image misconvergence correction method, comprising steps of:
    calculating a convergence correction value of a pulse to correct a misconvergence value of a video signal outputted from a display device;
    performing D-class amplification with respect to the convergence correction value to amplify voltages and currents;
    controlling a path of an electron beam corresponding to the video signal by a magnetic field formed according to a current based on the D-class-amplified convergence correction value; and
    calculating a differentially amplified voltage value for a noise-removed current, and feeding back to the step for calculating the calculated voltage value.

10. An image misconvergence correction method comprising:
    calculating a convergence correction value of a pulse to correct a misconvergence value of a video signal outputted from a display device;
    performing D-class amplification with respect to the convergence correction value to amplify voltages and currents;
    controlling a path of an electron beam corresponding to the video signal by a magnetic field formed according to a current based on the D-class-amplified convergence correction value; and
    calculating a voltage value for a noise-removed current, and feeding back to the step for calculating the convergence correction value, wherein the step for controlling the electron beam path further includes a step for removing noise with respect to the current forming the magnetic field.

11. The image misconvergence correction method as claimed in claim 10, wherein the feedback step includes steps of:
    calculating voltages for the current forming the magnetic field;

amplifying the voltages and obtaining a differential voltage of the voltages; and amplifying the differential voltage and generating a predetermined voltage value.

12. The image misconvergence correction method as claimed in claim 10, wherein the step for calculating the convergence correction value includes steps of:

inputting the misconvergence value;

generating a triangular waveform of a set frequency;

comparing potential levels of the misconvergence value and the triangular waveform; and generating a pulse width-modulated signal based on a result of the comparison.

13. The image misconvergence correction method as claimed in claim 12, wherein the step for calculating the convergence correction value further includes steps of:

inputting the fed-back voltage value; and combining the triangular waveform and the fed-back voltage value.

14. The image misconvergence correction method as claimed in claim 13, wherein the step for performing the D-class amplification further includes a step for low-pass-filtering the amplified convergence correction value.

* * * * *